UNITED STATES PATENT OFFICE.

HENRY NAPIER, OF ELIZABETH, NEW JERSEY.

IMPROVED DISINFECTING COMPOUND.

Specification forming part of Letters Patent No. 57,174, dated August 14, 1866.

*To all whom it may concern:*

Be it known that I, HENRY NAPIER, of Elizabeth, in the county of Union and State of New Jersey, have invented a new and Improved Disinfecting Compound; and I do hereby declare that the following is a full, clear, and exact description thereof, which will enable others skilled in the art to fully understand and make use of the same.

This invention relates to a disinfecting compound, the chief ingredient of which is phenic acid, and which can be used with good effect in public places, or in hospitals, sick-rooms, and wherever a disinfectant is required.

In preparing my compound I take phenyl, otherwise known as phenic acid, carbolic acid, &c., in as pure a state as it can be cheaply and readily obtained, and combine it with alumina, in the condition of clay, as free from silicious matter as practicable. To this I add perchloride of iron or of manganese in such proportions as I find necessary. In some instances I use a little quicklime for the purpose of drying the mixed materials more fully. To the whole I add a solid sulphite—as, for instance, sulphite of lime, magnesia, or soda—and grind the mass into a fine powder for use.

The proportions I find most suitable for general purposes are as follows: Alumina, one hundred parts; phenic acid, ten parts; perchloride of iron, ten parts; sulphite of lime, magnesia, or soda, ten parts. The proportions may, however, be varied without changing the principle involved.

The advantages I claim for my powder are these: The phenic acid is powerfully antiseptic, preventing putrefaction, and acting as a true disinfectant in that direction. The metallic perchloride instantly deodorizes excrementitious or other offensive matter. The sulphite assists this by preventing the oxidation of the matter to be acted on. The alumina is a natural disinfectant and absorber of evolved gases and a base neutral to the other ingredients.

I do not claim the use of the above materials separately from each other, nor do I confine myself to the exact proportions given; but

What I claim as new, and desire to secure by Letters Patent, is—

1. The combination of phenic acid with alumina, for the purposes set forth.
2. The combination of a metallic perchloride with alumina, for the purposes set forth.
3. The combination of a solid sulphite with alumina, for the purposes set forth.
4. A disinfecting compound made as herein described.

HENRY NAPIER.

Witnesses:
WM. F. MCNAMARA,
ALEX. F. ROBERTS.